US010956515B2

(12) United States Patent
Guo et al.

(10) Patent No.: US 10,956,515 B2
(45) Date of Patent: Mar. 23, 2021

(54) SMART SUGGESTIONS PERSONALIZATION WITH GLMIX

(71) Applicant: Microsoft Technology Licensing, LLC, Redmond, WA (US)

(72) Inventors: Qi Guo, Sunnyvale, CA (US); Xianren Wu, San Jose, CA (US); Bo Hu, Mountain View, CA (US); Shan Zhou, San Jose, CA (US); Lei Ni, Belmont, CA (US); Erik Eugene Buchanan, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 519 days.

(21) Appl. No.: 15/898,976

(22) Filed: Feb. 19, 2018

(65) Prior Publication Data
US 2019/0258739 A1 Aug. 22, 2019

(51) Int. Cl.
*G06F 16/90* (2019.01)
*G06F 16/951* (2019.01)
*G06Q 50/00* (2012.01)
*G06N 20/00* (2019.01)

(52) U.S. Cl.
CPC ........... *G06F 16/951* (2019.01); *G06N 20/00* (2019.01); *G06Q 50/01* (2013.01)

(58) Field of Classification Search
None
See application file for complete search history.

(56) References Cited

U.S. PATENT DOCUMENTS

| 7,512,612 | B1 | 3/2009 | Akella et al. |
| 8,433,705 | B1 | 4/2013 | Dredze et al. |
| 9,110,955 | B1 | 8/2015 | Bernhardsson |
| 9,280,587 | B2 | 3/2016 | Renders et al. |
| 9,336,314 | B2 | 5/2016 | Lam |
| 10,628,432 | B2 | 4/2020 | Guo et al. |
| 10,726,025 | B2 | 7/2020 | Guo et al. |
| 2012/0084235 | A1 | 4/2012 | Suzuki et al. |

(Continued)

OTHER PUBLICATIONS

"Non Final Office Action Issued in U.S. Appl. No. 15/898,964", dated Dec. 27, 2019, 17 Pages.

(Continued)

*Primary Examiner* — Belix M Ortiz Ditren
(74) *Attorney, Agent, or Firm* — Schwegman Lundberg & Woessner, P.A.

(57) ABSTRACT

In an example, an indication of a plurality of different entities in a social networking service is received, including at least two entities having a different entity type. Then a plurality of user profiles in the social networking service are accessed. A machine-learned model is then used to calculate, based on co-occurrence counts reflecting a number of user profiles in the plurality of user profiles in which corresponding nodes co-occurred, a similarity score between a first node and second node by computing distance between the first node and the second node in a d-dimensional space on which a plurality of entities are mapped, the similarity score generated using a generalized linear mixed model having a global coefficient vector applied to global function pertaining to the co-occurrence counts and a first random effects coefficient vector applied to a random effects per-country function.

20 Claims, 12 Drawing Sheets

(56) References Cited

U.S. PATENT DOCUMENTS

| | | |
|---|---|---|
| 2013/0191416 A1 | 7/2013 | Lee et al. |
| 2014/0188899 A1 | 7/2014 | Whitnah et al. |
| 2015/0227619 A1 | 8/2015 | Xie et al. |
| 2017/0193451 A1 | 7/2017 | Fang |
| 2017/0286865 A1 | 10/2017 | Fang et al. |
| 2018/0130019 A1 | 5/2018 | Kolb et al. |
| 2018/0137155 A1 | 5/2018 | Majumdar |
| 2018/0150864 A1* | 5/2018 | Kolb .................. G06Q 30/0223 |
| 2018/0197108 A1 | 7/2018 | Fang et al. |
| 2019/0251422 A1 | 8/2019 | Ramanath et al. |
| 2019/0258721 A1 | 8/2019 | Guo et al. |
| 2019/0258722 A1 | 8/2019 | Guo et al. |
| 2019/0258963 A1 | 8/2019 | Guo et al. |

OTHER PUBLICATIONS

"Notice of Allowance Issued in U.S. Appl. No. 15/898,985", dated Jan. 31, 2020, 11 Pages.

\* cited by examiner

SMART SUGGESTIONS PERSONALIZATION WITH GLMIX

TECHNICAL FIELD

The present disclosure generally relates to computer technology for solving technical challenges in entity representation. More specifically, the present disclosure relates to personalized smart suggestions using a generalized linear mixed effect model (GLMix)

BACKGROUND

The rise of the Internet has occasioned two disparate phenomena: the increase in the presence of social networks, with their corresponding member profiles visible to large numbers of people, and the increase in use of social networks for job searches, both by applicants and by employers. Employers, or at least recruiters attempting to connect applicants and employers, often perform searches on social networks to identify candidates who have qualifications that make them good candidates for whatever job opening they are attempting to fill. The employers or recruiters then can contact these candidates to see if they are interested in applying for the job opening.

Traditional querying of social networks for candidates involves the employer or recruiter entering one or more search terms to manually create the query. A key challenge in talent searches is to translate the criteria of a hiring position into a search query that leads to desired candidates. To fulfill this goal, the searcher has to understand which skills are typically required for the position, what the alternatives are, which companies are likely to have such candidates, from which schools the candidates are most likely to have graduated, and so forth. Moreover, the knowledge vanes over time. As a result, it is not surprising that even for experienced recruiters, obtaining a satisfactory query often requires many searching trials.

BRIEF DESCRIPTION OF THE DRAWINGS

Some embodiments of the technology are illustrated, by way of example and not limitation, in the figures of the accompanying drawings

FIG. 8 is a screen capture illustrating a screen of a graphical user interface displaying suggested search terms as facets in accordance with an example embodiment.

DETAILED DESCRIPTION

Overview

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, standardized entities, such as skills, title, industries, schools, locations, etc., can be represented in a heterogeneous graph. An entity graph can be constructed using the standardized entities. For example, an edge can be built between the skill "Java" and the title "Software Engineer," indicating a correlation between these two entities, with the edge weight being the co-occurrence count of these entities in user profiles.

The entity graph is undirected. Node proximity in this entity graph can then be used to calculate affinity scores for standardized entities, as well as for search query terms that can be easily mapped to standardized entities. For search query terms that are non-standardized, the entity graph may be used to train an embedding for standardized entities that can be used as a starting point to train additional embedding for the non-standardized entities.

Thus, in an example embodiment, embedding for standardized entities may be trained (or otherwise determined). These embeddings for standardized entities can then be fixed and used to perform additional embedding training for non-standardized keywords, using search data.

Figure 1:
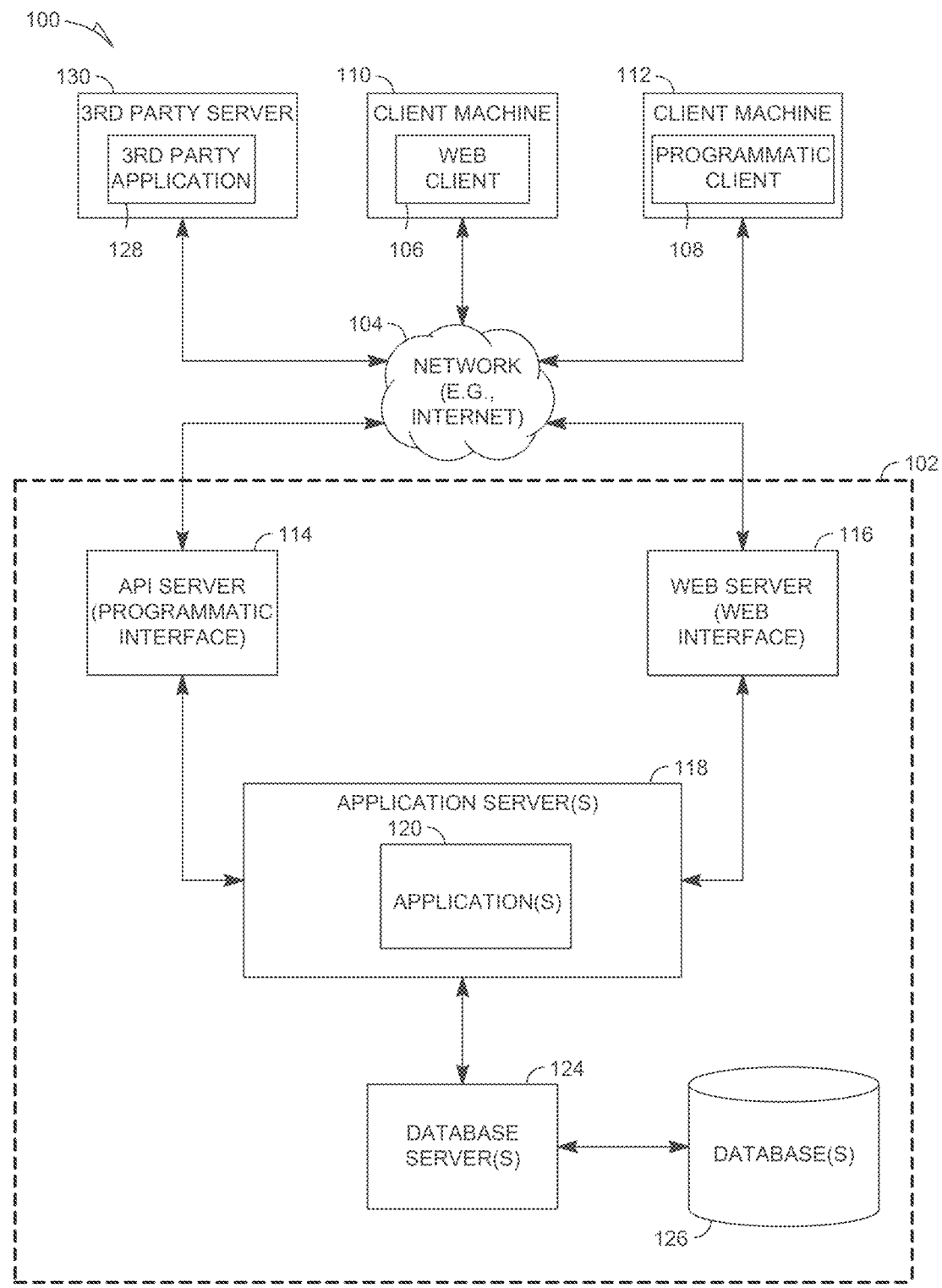
FIG. 1 is a block diagram illustrating a client-server system, in accordance with an example embodiment.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application programming interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third-party application 128, executing on a third-party server 130, as having programmatic access to the networked system 102 via the programmatic interface provided by the API server 114. For example, the third-party application 12S may, utilizing information retrieved from the networked system 102, support one or more features or functions on a website hosted by a third party. The third-party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the client machines 110, 112 and the third-party server 130 may be a mobile device) to access and browse online content, such as any of the online content disclosed herein. A mobile server (e.g., the API server 114) may communicate with the mobile app and the application servers) 118 in order to make the features of the present disclosure available on the mobile device.

Figure 2:
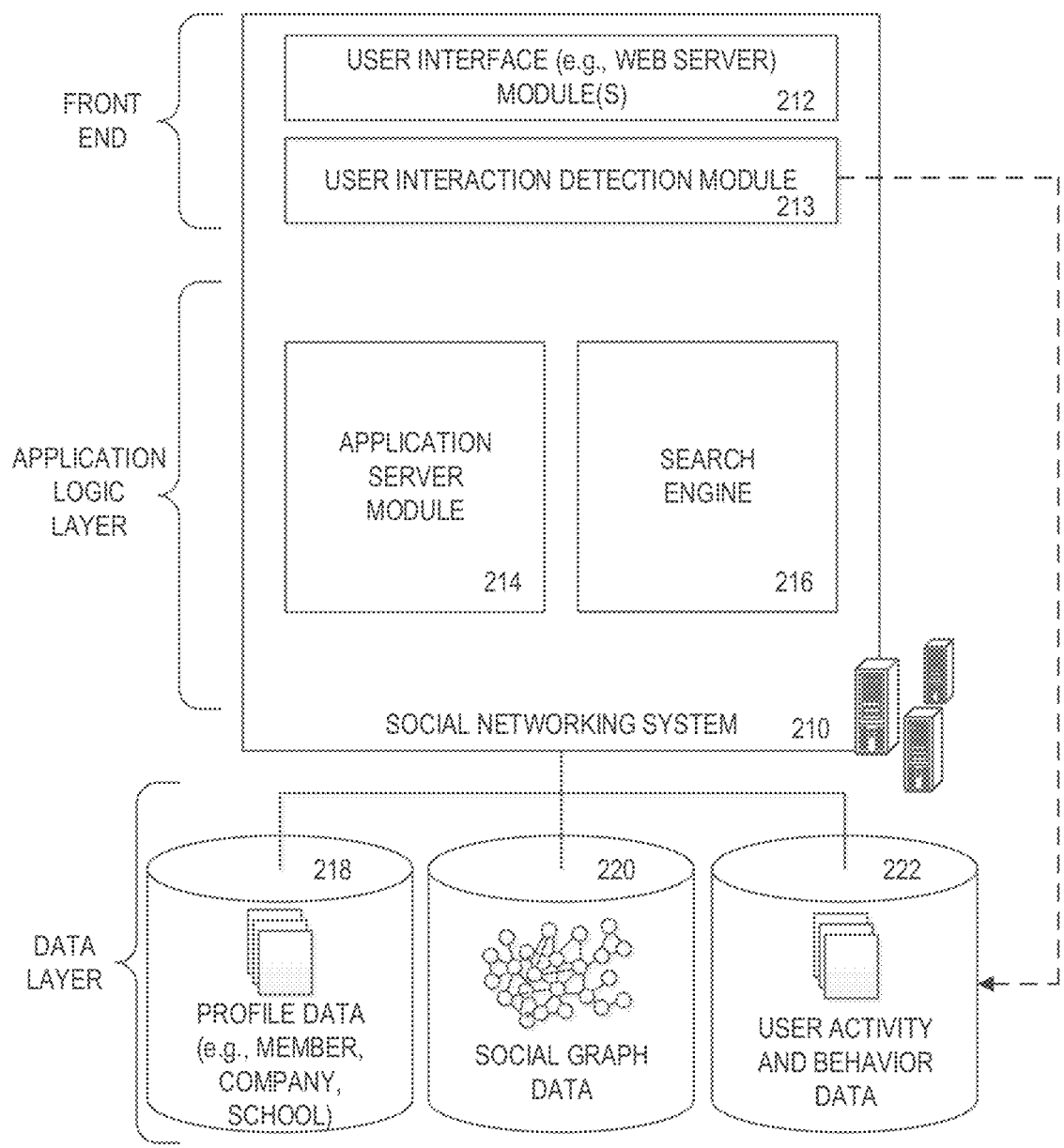
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices, and communicates appropriate responses to the requesting client devices. For example, the user interface module(s) 212 may receive requests in the form of Hypertext Transfer Protocol (HTTP) requests or other web-based API requests In addition, a user interaction detection module 213 may be provided to detect various interactions that users have with different applications 120, services, and content presented. As shown in FIG. 2, upon detecting a particular interaction, the user interaction detection module 213 loss the interaction, including the type of interaction and any metadata relating to the interaction, in a user activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases, such as a profile database 218 for storing profile data, including both user profile data and profile data for various organizations (e.g., companies, schools, etc.). Consistent with some embodiments, when a person initially registers to become a user of the social networking service, the person will be prompted to provide some personal information, such as his or her name, age (e.g., birthdate), gender, interests, contact information, home town, address, spouses and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218, or another database (not shown). In some embodiments, the profile data may be processed (e.g., in the background or offline) to generate various derived profile data. For example, if a user has provided information about various job titles that the user has held with the same organization or different organizations, and for how long, this information can be used to infer or derive a user profile attribute indicating the user's overall seniority level, or seniority level within a particular organization In some embodiments, importing or otherwise accessing data from one or more externally hosted data sources may enrich profile data for both users and organizations. For instance, with organizations in particular, financial data may be imported from one or more external data sources and made part of an organization's profile. This importation of organization data and enrichment of the data will be described in more detail later in this document.

Once registered, a user may invite other users, or be invited by other users, to connect via the social networking service. A "connection" may constitute a bilateral agreement by the users, such that both users acknowledge the establishment of the connection. Similarly, in some embodiments, a user may elect to "follow" another user. In contrast to establishing a connection, "following" another user typically is a unilateral operation and, a least in some embodiments, does not require acknowledgement or approval by the user who is being followed. When one user follows another, the user who is following may receive status updates (e.g., in an activity or content stream) or other messages published by the user being followed, or relating to various activities undertaken by the user being followed. Similarly, when a user follows an organization, the user becomes eligible to receive messages or status updates published on behalf of the organization. For instance, messages or status updates published on behalf of an organization that a user is following will appear in the user's personalized data feed, commonly referred to as an activity stream or content stream. In any case, the various associations and relationships that the users establish with other users, or with other entities and objects, are stored and maintained within a social graph in a social graph database 220.

As users interact with the various applications 120, services, and content made available via the social networking service, the users' interactions and behavior (e.g., content viewed, links or buttons selected, messages responded to, etc.) may be tracked, and information concerning the users' activities and behavior may be logged or stored, for example, as indicated in FIG. 2, by the user activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking service system 210 provides an API module via which applications 120 and services can access various data and services provided or maintained by the social networking service. For example, using an API, an application 120 may be able to request and/or receive on or more navigation recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Further, while in many cases th applications 120 or services that leverage the API may be applications 120 and services that are developed and maintained by the entity operating the social networking service, nothing other than data privacy concerns prevents th API from being provided to the public or to certain third parties under special arrangements, thereby making the navigation recommendations available to third-party applications 128 and service.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when user profiles are indexed, forward search indexes are created and stored. The search engine 216 facilities the indexing and searching for content within the social networking service, such as the indexing and searching for data or information contained in the data layer, such as profile data (stored, e.g., in the profile database 218), social graph data (stored, e.g., in the social graph database 220), and user activity and behavior data (stored, e.g., in the user activity and behavior database 222), as well as job postings. The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
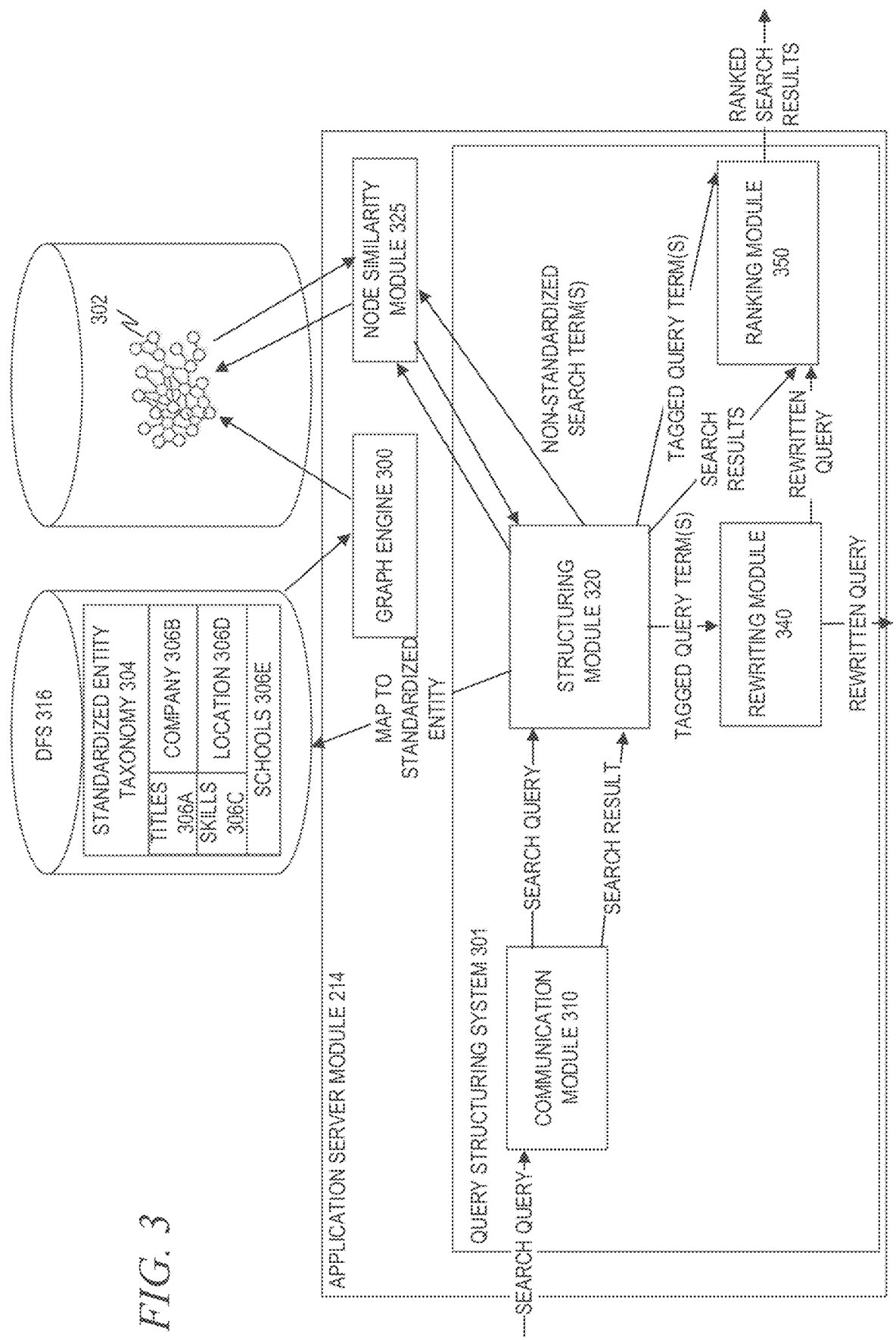
FIG. 3 is a block diagram illustrating the application server module of FIG. 2 in more detail.

FIG. 3 is a block diagram illustrating the application server module 214 of FIG. 2 in more detail. While in many embodiments the application server module 214 will contain many subcomponents used to perform various different actions within the social networking service system 210, in FIG. 3 only those components that are relevant to the present disclosure are depicted. A graph engine 300 generates a heterogeneous graph structure 302 from a standardized entity taxonomy 304 and from profile data (such as the data in database 218). The heterogeneous graph structure 502 may contain a plurality of nodes, with each node corresponding to a different entity in the standardized entity taxonomy 304.

As will be described in more detail below, in some example embodiments not all entities in the standardized entity taxonomy 304 are represented by nodes in the heterogeneous graph structure 302, but rather a subset of the entities are represented in the heterogeneous graph structure 302.

The graph engine 300 further generates edges between nodes of the heterogeneous graph structure 302 based on co-occurrence counts of the entities in user profiles in the profile database 218. Thus, for each pair of connected nodes, the edge between the nodes may be labelled or tagged with a count of the number of user profiles in which both the entities represented by the pair of connected nodes appear.

A communication module 310 is configured to perform various communication functions to facilitate the functionality described herein. For example, the communication module 310 may communicate with users via the network 104 using a wired or wireless connection. The communication module 310 may also provide various web services functions such as retrieving information from the third-party servers 130 and the social networking service system 210. In this way, the communication module 310 facilitates the communication between the query structuring system 301, the client machines 110, 112, and the third-party servers 130 via the network 140. Information retrieved by the communication module 310 may include profile data corresponding to the user and other members of the social network service from the social networking service system 210. As depicted, the communication module 310 is further configured to receive an input query to perform a search on information, including, but not limited to, member profiles. The input query may be received via a front-end interface, such as a web page rendered in a web browser or a dedicated client application. Regardless of how the input query is obtained, it can be passed to the structuring module 320 for further processing prior to the query being executed on whatever relevant database(s) can fulfil the query.

The structuring module 320 may, for example, receive an input query of "software engineer," and map the term "software engineer" to the standardized term "Software Engineer" with a title identification (ID) (e.g., 21) within the standardized entity taxonomy 304. The entity "software engineer" in the query can then be tagged with this title ID (21).

A Structuring module 320 is configured to generate, from an input query, a tagged version of the query that includes information about standardized entities of the query. The standardized entity taxonomy 304 may be referenced during this process. The standardized entity taxonomy 304 may include an indication of various standardized entities and corresponding entity identifications (such as unique numbers corresponding to each entity). The standardized entity taxonomy 304 may include various portions devoted to different taxonomy categories, such as for example, a titles portion 306A, a company portion 306B, a skills portion 306C, a location portion 306D, and a schools portion 306B. In other embodiments, each of these portions 306A-306E may be stored as its own independent taxonomy.

In some example embodiments, the standardized entity taxonomy 304 may comprise a data structure that includes different levels of a hierarchy, such as a tree graph. This allows some of the standardized entities to be parents or children of other standardized entities, reflecting a hierarchical relationship between them. For example, the titles of "software engineer" and "software developer" both may be children nodes of a higher-level title known as "computer scientist."

The standardized entity taxonomy 304 may be stored in, for example, a Distributed File System (DFS) 316. The heterogeneous graph structure 302 may be stored in another database 306. In some example embodiments, however, the heterogeneous graph structure 302 may also be stored in the DFS 316.

Similarity between the entities lagged in the query and one or more standardized entities may be calculated by a node similarity module 325. The node similarity module 325 may use one or more embedding functions to compute similarity between nodes in the heterogeneous graph structure 302. This may include, for example, computing similarity between nodes that do not have direct edges between them.

It should be noted that this similarity need not necessarily be computed at query time. The node similarity module 325 could work offline to compute similarity scores between multiple nodes in the heterogeneous graph structure 302 and save these similarity scores with the heterogeneous graph structure 302.

The initial tagged query can be passed as input to various other modules, including the rewriting module 340 and the ranking module 350.

In the rewriting module 340, the tagged raw query may be augmented through various mechanisms. First, the initial tagging can be augmented by adding Boolean keywords, which will be useful when additional entities are added in a subsequent step. Thus, terms like "AND" and "OR" can be added to the query. At this point, additional entities can be added to the query based on confidence scores assigned to those additional entities, as generated using the standardized entities in the query. Thus, for example, if the query has been tagged with the standardized title ID of 21, then additional titles (e.g., "software developer" with a title ID 22) may also be added, if the confidence scores so indicate. Additionally, the standardized entities themselves can be added to the query.

Figure 4:
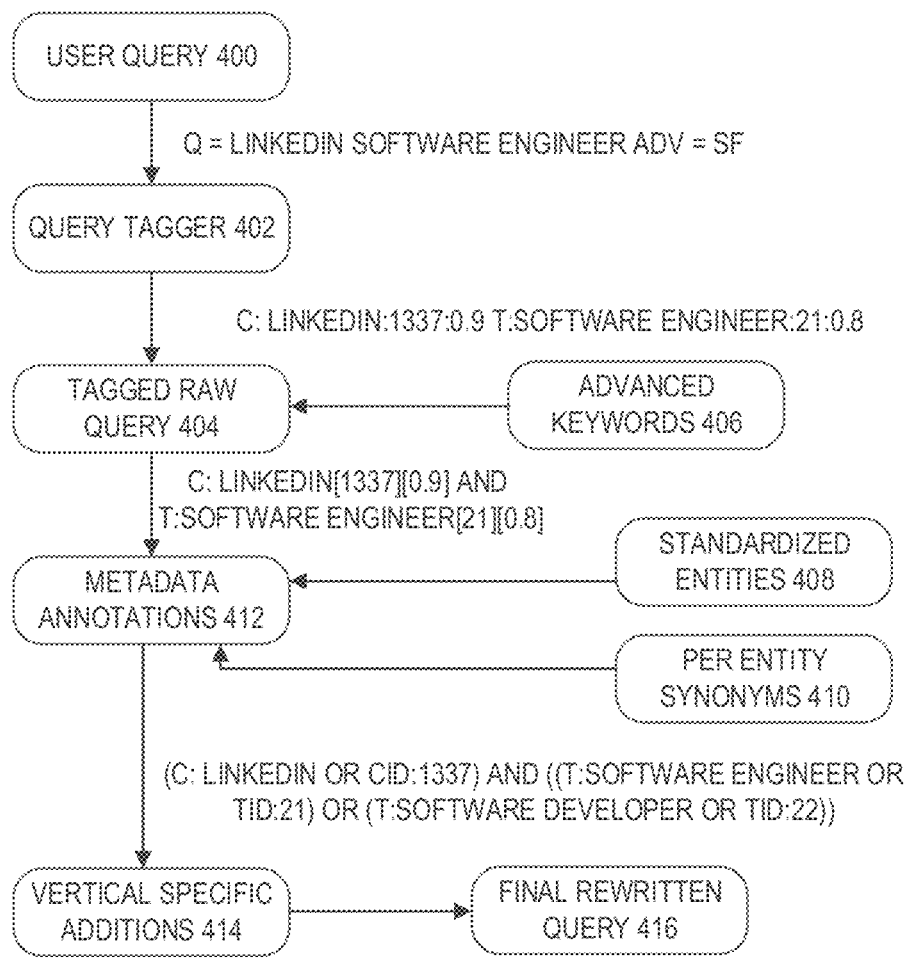
FIG. 4 is a diagram illustrating an example of the processes executed in the structuring module, in accordance with an example embodiment.

FIG. 4 is a diagram illustrating an example of the processes executed in the structuring module 320, in accordance with an example embodiment. Here, a user query 400 may be "linkedin software engineer." A query tagger 402 may then identify that "linkedin" bears a strong resemblance to a company entity in a company portion of the standardized entity taxonomy 304 having a standardized company name of "LinkedIn." The standardized company identification (1337) can then be tagged in the query. Likewise, the term "software engineer" in the query may be mapped to the standardized tide "Software Engineer" in a title portion of the standardized entity taxonomy 304. The standardized title identification for "Software Engineer" (21) can be tagged to this term in the query. The result is a tagged raw quay 404. It should be noted that the tagged raw query 404 may also include an indication of the entity type for each term, here depicted as "C" for company name and "T" for title. This may be helpful in the later execution of the query as search results can be searched based on these entity types. Thus, for example, rather than looking in all fields of a search result for "linkedin," only the company name field may be searched, thereby reducing processing time.

Advanced keywords 406 can then be added to the tagged raw query 404 to introduce Boolean logic terms into the query. Here, for example, an AND may be added to the tagged raw query in light of the fact that both the terms on either side of the AND were explicitly entered as search terms by the user.

Then standardized entities 408 and per entity synonyms 410 can be added as metadata annotations 412 to the tagged raw query 404. Standardized entities 408 are the identifications of the standardized entities added earlier. This step involves breaking out those identifications as independent search query terms and linking them to the original search query term via an OR operator. Per entity synonyms 410 include additional standardized entity names and identifications that have been previously identified as synonyms of query terms and/or standardized entities in the tagged raw query 404.

Then, various vertical specific additions 414 may be added to the query. Vertical specific additions 414 allow for different granularities of a search term to be explored, based on the entity type. For example, a particular job title may be associated with various job functions. These job functions may be stored in the standardized entity taxonomy 304 as child nodes of the job title node. The rewriting module 340 may explore adding these child job functions as additional query terms based on confidence scores assigned to these child job functions (e.g., the likelihood that a user typing a specific title actually means specific job functions and does not mean other specific job functions).

In some embodiments, the rewritten query is presented to the user and the user may alter the input query to clarify the ambiguity. In some embodiments, any clarification added by the user subsequent to the initial query is added to the existing generated data structure. For instance, continuing with the above example, the user's initial query is "linkedin software engineer." Subsequently, after a search result is returned for that initial query, the user may add in the word "company," resulting in the second query "linkedin company software engineer" to clarify any ambiguity between the company "linkedin" and another type of entity called "linkedin," such as a skill.

The result of this entire process is a final rewritten query 416.

Referring back to FIG. 3, the rewritten query may then be passed from the structuring module 320 to a query processor (not pictured) that performs a search on the query and returns search results to the ranking module 350. While not pictured in FIG. 3, in some example embodiments, these communications may be passed through the communication module 310.

In various embodiments, the ranking module 350 is configured to rank documents retrieved in response to a search query in an order of relevance baaed on various factors, including, for example, the match of the input query to the information within a document, personal information within the member profile of the searcher or result, and/or information pertaining to the professional network of the searcher or result. Each factor that influences the ranking order of the retrieved documents has an associated predetermined weight, with the document scoring higher based on these predetermined weights being ranked higher. For example, first connections may be weighted more than second connections, and so forth, where a first connection refers to the user being directly connected to the second member profile. A second connection refers to the user being directly connected to another member's profile, who is then directly connected to the second member profile. In another example, member profiles that share similarities with the user's profile are weighted more than other member profiles that have fewer similarities.

In an example embodiment, the ranking module 350 uses a multi-pass scorer on results documents. At each pass, the search results are filtered and downgraded based on entity-based features from, for example, the tagged raw query 404 and/or the final rewritten query 416.

In another example embodiment, rather than a strict augmenting of queries based on the similarity scores, the similarity scores may be used to surface one or more facets visually to the searcher, allowing the searcher to refine or filter their search by selecting one or more of these presented facets. This will be described in more detail below.

In some implementations, a presentation module (not pictured) is configured to present query rewriting recommendations to the user, present search results according to their ranked order, present a reason associated with why the query result is being presented (e.g., such as a shared connection), and present the search results with category selected highlighting. In some embodiments, where there are ambiguities associated with a word, the interpretation associated with retrieving a result is shown to the user. In various implementations, the presentation module presents or causes presentation of information (e.g., visually displaying information on a screen, acoustic output, haptic feedback). Interactively presenting information is intended to include the exchange of information between a particular device and the user of that device. The user of the device may provide input to interact with a user interface in many possible manners such as alphanumeric, point-based (e.g., cursor), tactile, or other input (e.g., touch screen, tactile sensor, light sensor, infrared sensor, biometric sensor, microphone, gyroscope, accelerometer, or other sensors), and the like. It will be appreciated that the presentation module provides many other user interlaces to facilitate functionality described herein. Further, it will be appreciated that "presenting" as used herein is intended to include communicating information or instructions to a particular device that is operable to perform presentation based on the communicated information or instructions via the communication module 310, structuring module 320, rewriting module 340, and ranking module 350.

Figure 5:
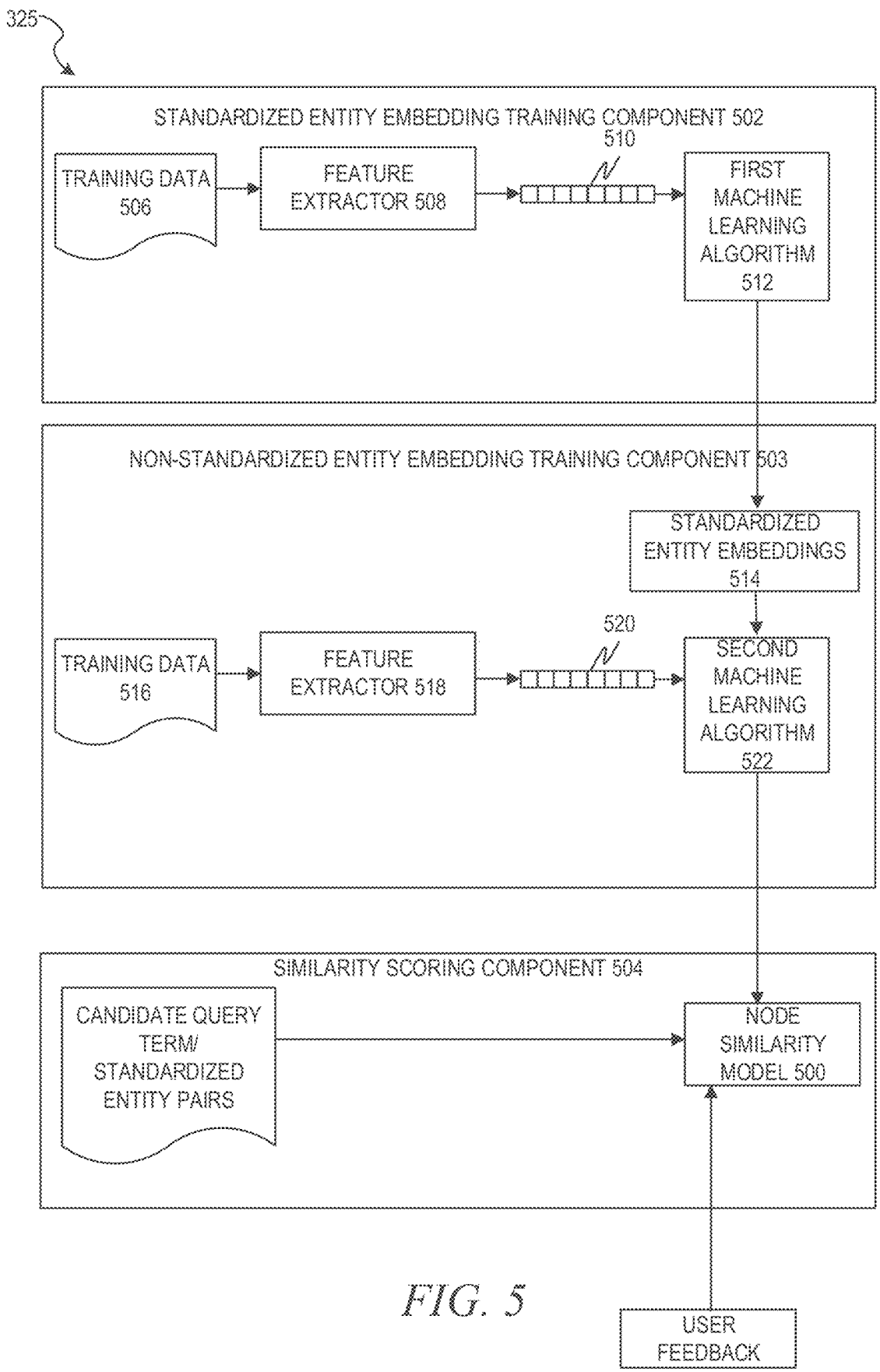
FIG. 5 is a block diagram illustrating a node similarity module in accordance with an example embodiment.

FIG. 5 is a block diagram illustrating a node similarity module 325 in accordance with an example embodiment. The node similarity module 325 may utilize multiple machine learning processes to arrive at a node similarity model 500 used to provide a similarity score for a particular node pair. The node similarity module 325 may comprise a standardized entity embedding training component 502, a non-standardized entity embedding training component 503, and a similarity scoring component 504. The training component 502 feeds training data 506 comprising, for example, member profile data and member activity information into a feature extractor 508 that extracts one or more features 510 for the information. A first machine learning algorithm 512 produces standardized entity embeddings 514 using the extracted features 510. In the non-standardized entity embedding training component 503, training data 516 are fed to a feature extractor 518, which extracts one or more features 520 from the training data 516. A second machine learning algorithm 512 uses these extracted features along with the standardized entity embeddings 514 to calculate non-standardized entity embeddings and form the node similarity model 500. In the similarity scoring component 504, candidate node pairs are fed to the node similarity model 500, which outputs a similarity score for each pair based on the model.

It should be noted that the node similarity model 500 may be periodically updated via additional training and/or user feedback. The user feedback may be either feedback from members performing searches (from administrators, for example). The feedback may include an indication about how successful the node similarity model 500 is in providing accurate similarity scores.

The first machine learning algorithm 512 may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method. In an example embodiment, an unsupervised machine learning algorithm is used.

The second machine learning algorithm 522 may be selected from among many different potential supervised or unsupervised machine learning algorithms. Examples of supervised learning algorithms include artificial neural networks. Bayesian networks, instance-based learning, support vector machines, random forests, linear classifiers, quadratic classifiers, k-nearest neighbor, decision trees, and hidden Markov models. Examples of unsupervised teaming algorithms include expectation-maximization algorithms, vector quantization, and information bottleneck method. In an example embodiment, a supervised machine learning algorithm is used.

In an example embodiment, the training data 516 includes records of interactions of searchers, such as recruiters, with previous search results. For example, an interaction that may be tracked and used as training data 516 is email communications initiated by the searcher to one or more of the candidates represented by search results In other words, if a recruiter contacts a candidate it may be assumed that the recruiter found something interesting in the search result corresponding to the candidate. As such, even if the search result was returned in response to a query that did not include a particular entity, if the search result includes that entity, it may be that a non-standardized term in the search query actually corresponds to that non-specified entity. Other positive searcher actions could be tracked and used in similar fashions, such as "clicks" on a search result as well as other social networking actions such as sharing the search result of sending a friend or link request to the search result.

As described above, the standardized entity embedding training component 502 and non-standardized entity embedding training component 503 may operate in an offline manner to train the node similarity model 500. The similarity scoring component 504, however, may be designed to operate in either an offline manner or an online manner.

Figure 6:
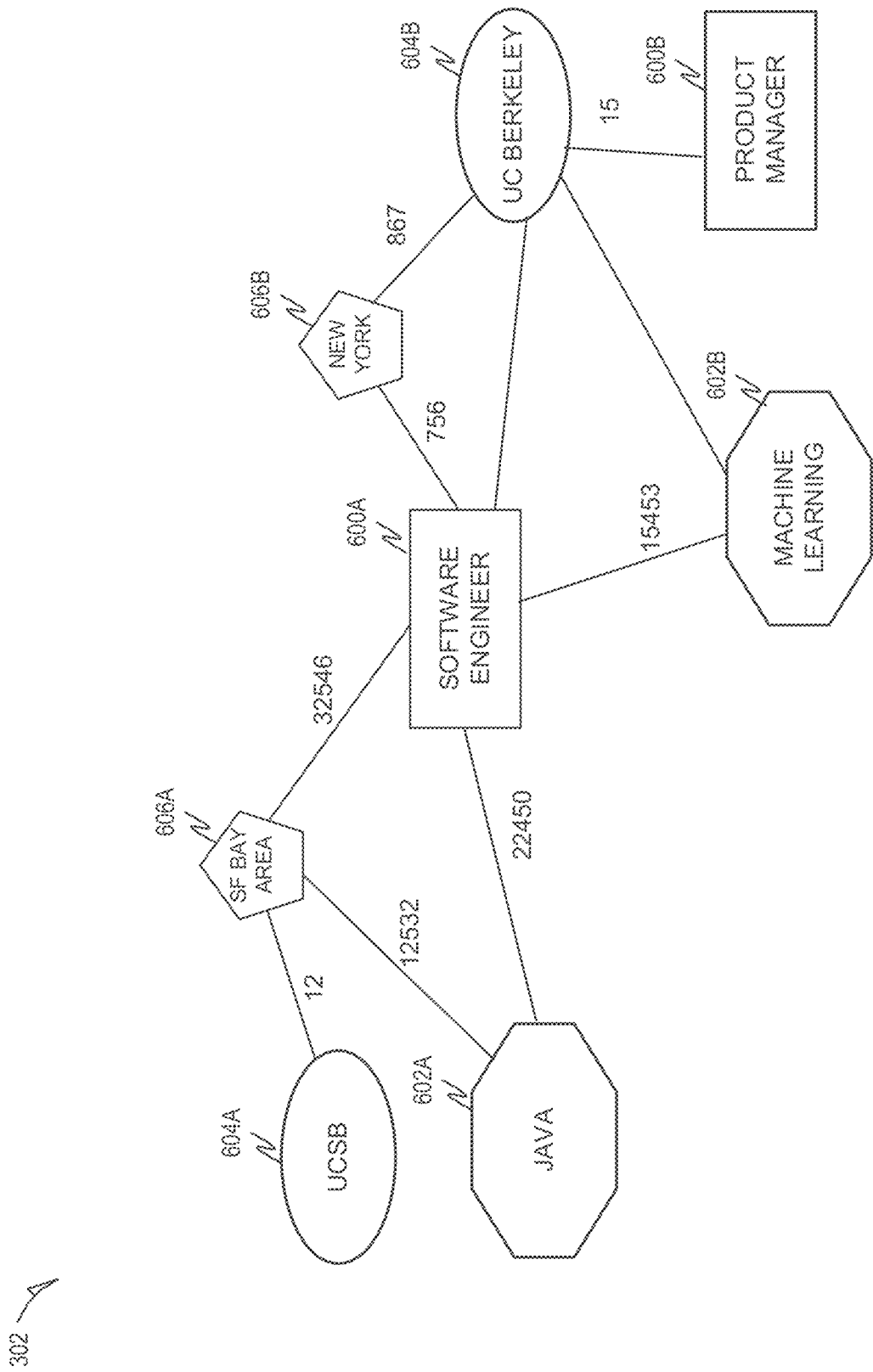
FIG. 6 is a block diagram illustrating a node similarity module in accordance with an example embodiment.

FIG. 6 is a block diagram illustrating a node similarity module 325 in accordance with an example embodiment. Here, the heterogeneous nature of the heterogeneous graph structure 302 can be seen in that there are nodes corresponding to different types of entities, including titles 600A, 600B; skills 602A, 602B; schools 604A, 604B; and locations 606A, 606B. As can be seen, edges between the nodes 600A-606B contain indications of the count of co-occurrences of the entities corresponding to the respective end-nodes. Thus, for example, this graph indicates there are 12,552 user profiles that contain both the skill 602A "Java" and the location 606A "SF Bay Area." Also notably, there are some entities from the standardized entity taxonomy 304 that are not stored in the heterogeneous graph structure 302 due to, for example, their co-occurrence count with any other node in the heterogeneous graph structure 302 being below a threshold amount. For example, a node for "Savannah Art College" may not be stored in the heterogeneous graph structure 302 if its co-occurrence count with the other nodes is less than a threshold count of 10. Limiting the heterogeneous graph structure 302 in this manner improves search speed and reduces storage space.

Figure 7:
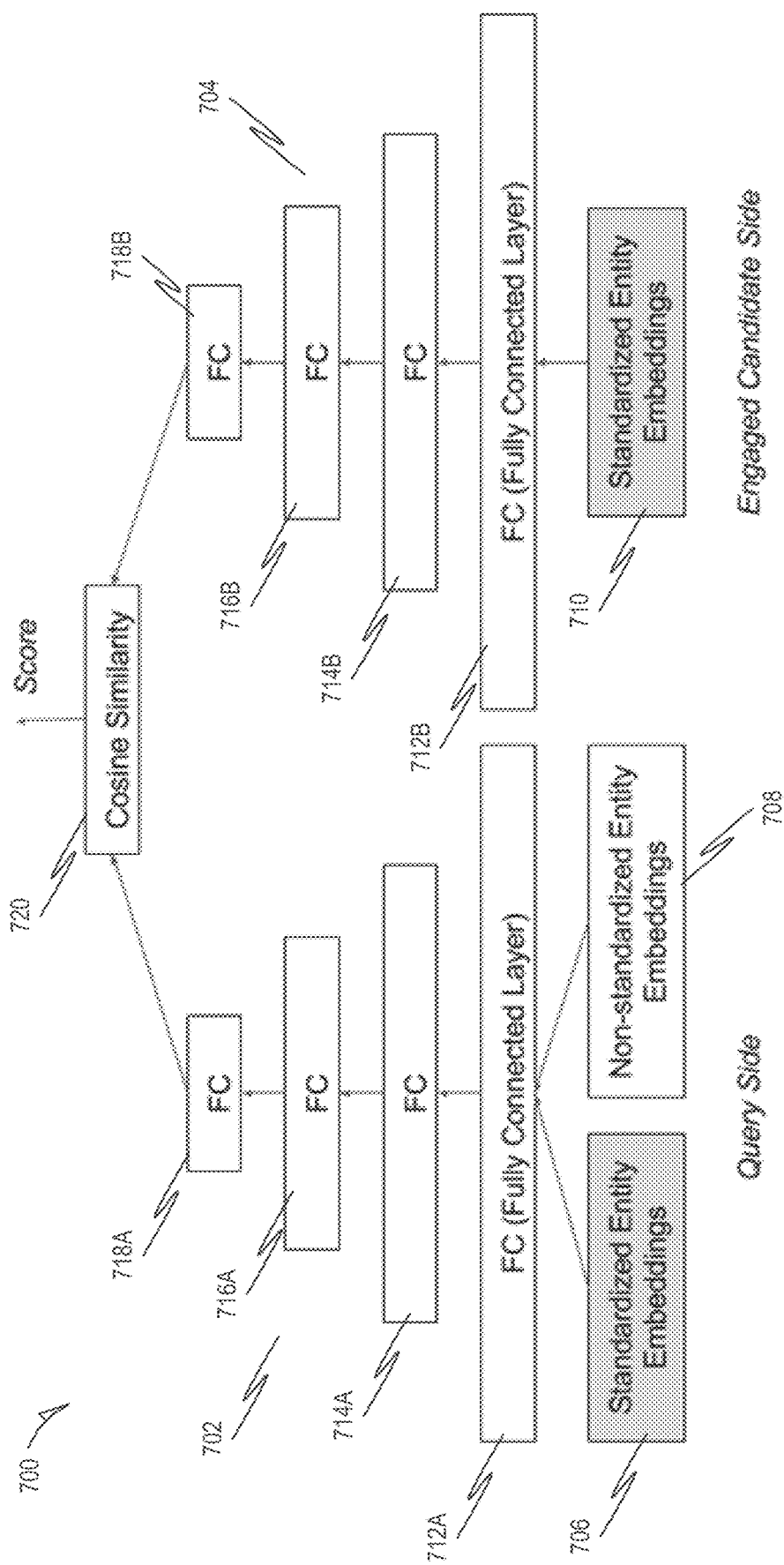
FIG. 7 is a diagram illustrating a DSSM for learning embeddings for non-standardized entity query terms in accordance with an example embodiment.

In an example embodiment, a deep structured semantic model (DSSM) is used as the second machine learning algorithm 522. FIG. 7 is a diagram illustrating a DSSM 700 for learning embeddings for non-standardized entity query terms in accordance with an example embodiment. Here, the DSSM 700 may be, for example, the second machine learning algorithm 522.

The DSSM 700 includes two sides 702, 704. The first side is a query side 702, which includes standardized entity embeddings 706 (as learned, for example, via the first machine learning algorithm 512) and non-standardized entity embeddings 708, which encoded query terms that are word hashed. The second side is an engaged candidate side 704m which includes standardized entities 710 from candidates who are considered to have been "engaged" (such as by recruiter email contact or search result clicking).

The standardized entity embeddings 706 and non-standardized entity embeddings 70S are passed through a first fully connected layer 712A, and then through several more fully connected layers 714A, 716A, 718A. These fully connected layers 714A, 716A, 718A are part of a multi-layer non-linear projection.

Figure 8:
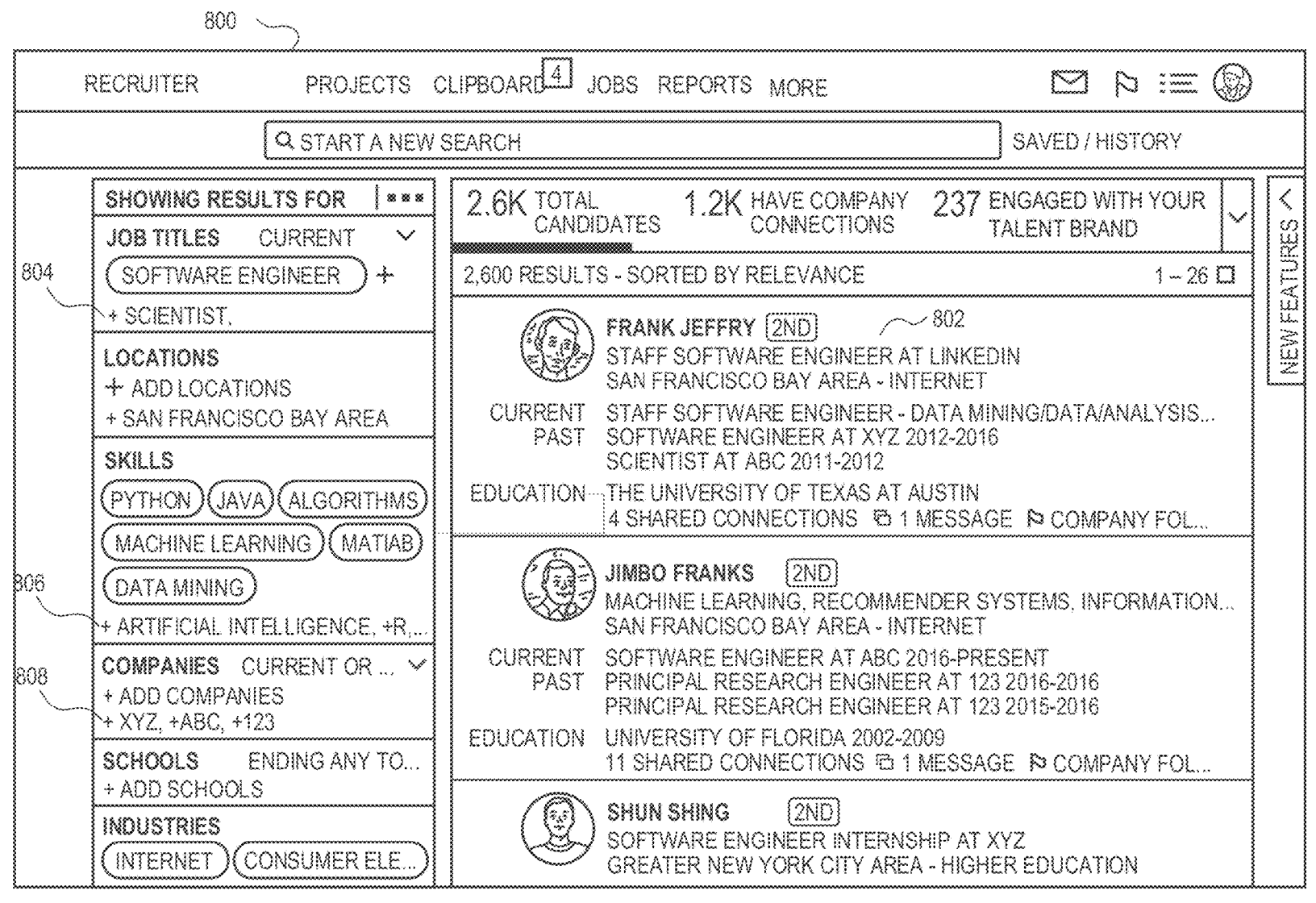

Similar fully connected layers 712B, 714B, 716B, 718B are contained on the engaged candidate side 704. A cosine similarity layer 720 determines the cosine similarity between the query and the engaged-in document. During training, the DSSM 700 may be trained to maximize this cosine similarity for training documents. Stochastic Graded Descent (SGD) may be used for this optimization. FIG. 8 is a screen capture illustrating a screen 800 of a graphical user interface displaying suggested search terms as facets in accordance with an example embodiment. The screen 800 presents results 802 of a first search query. The suggested additional search terms may be displayed as selectable facets 804, 806, 808 in various categories. For example, the "scientist" facet 804 is a job title that does not appear in any of the search results for this particular search query, but due to an analysis of a similarity score between a node representing "scientist" and one or more nodes corresponding to entities that do appear in the search results (such as software engineer), the system may determine that such a title could be recommended. The recruiter viewing this screen 800 may select the "+" sign on the "scientist" facet 804 to perform an updated search that includes the term "scientist." Similar selections may be made on the "artificial intelligence" facet 806 and "XYZ" facet 808.

Figure 9:
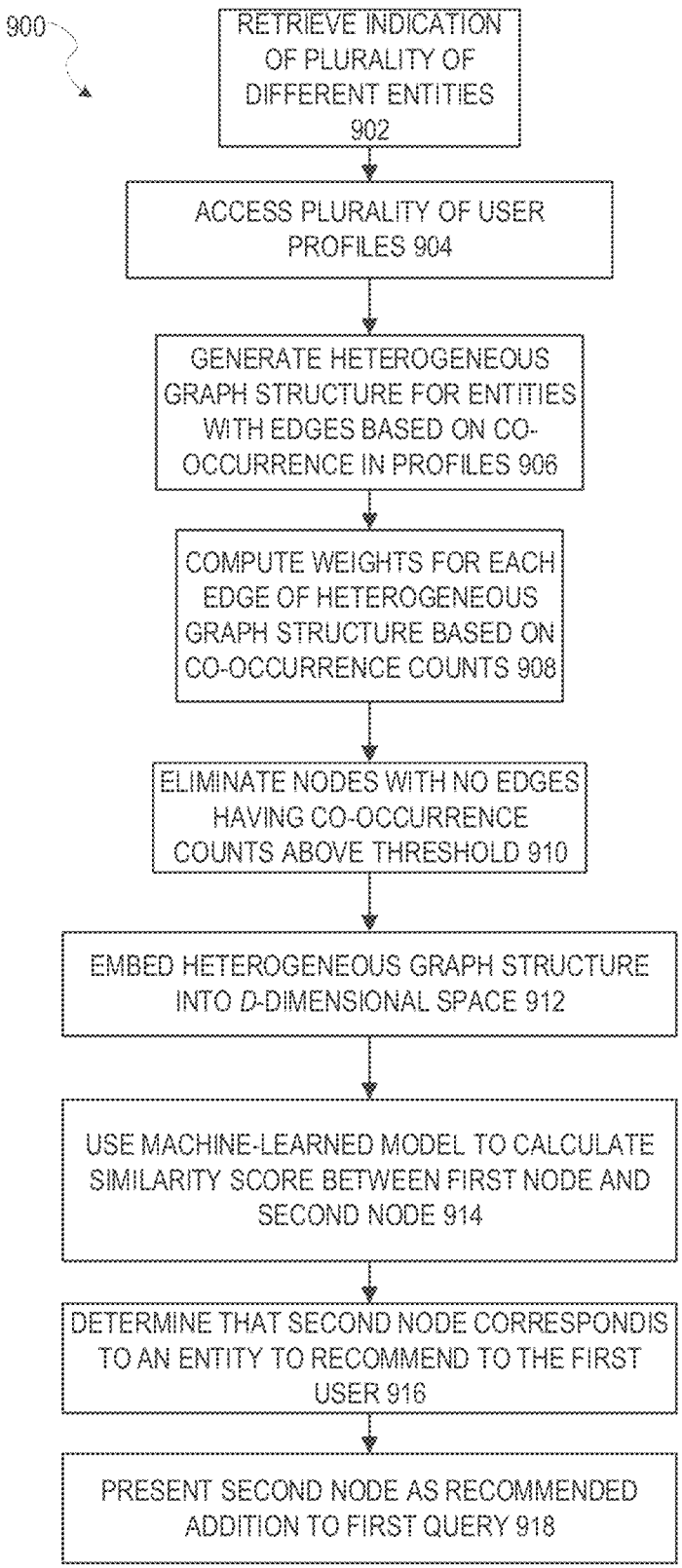
FIG. 9 is a flow diagram illustrating a method for recommending a search term as a facet in a graphical user interface in accordance with an example embodiment.

FIG. 9 is a flow diagram illustrating a method 900 for recommending a search term as a facet in a graphical user interface in accordance with an example embodiment. At operation 902, an indication of a plurality of different entities in a social networking service is retrieved, including at least two entities having a different entity type. This indication may be a standardized entity taxonomy. At operation 904, a plurality of user profiles in the social networking service are accessed. At operation 906, a heterogeneous graph structure comprising a plurality of nodes connected by edges is generated. Each node corresponds to a different of the entities in the plurality of different entities and each edge represents a co-occurrence of entities represented by nodes on each side of the edge in at least one of the user profiles. At operation 908, weights are computed for each edge of the heterogeneous graph structure, the weights being based on co-occurrence counts reflecting a number of user profiles in the plurality of user profiles in which corresponding nodes co-occurred. At operation 910, any nodes that correspond to entities having a co-occurrence count with any other nodes in the heterogeneous graph structure less than a preset threshold may be eliminated from the heterogeneous graph structure.

At operation 912, the heterogeneous graph structure is embedded into a d-dimensional space. At operation 914, a machine-learned model is used to calculate a similarity score between a first node and second node by computing distance between the first node and the second node in the d-dimensional space. The machine-learned model may be, for example, an unsupervised machine-learned model.

The first node may correspond to an entity contained in a first user profile returned to a first user in response to a first search query. At operation 916, it may be determined that the second node corresponds to an entity to recommend to the first user in response to the first query based on the calculated similarity score. At operation 918, the second code may be presented as a recommended addition to the first query. This may include, for example, displaying the entity corresponding to the second node as a selectable facet in a graphical user interface displaying the first user profile as a search result for the first query. Alternatively, this may include displaying the entity corresponding to the second node as an added search term available for query augmentation in a graphical user interface displaying the first user profile as a search result for the first query.

The above node similarity scores are based on global data. In an example embodiment, personalization may be provided by adapting the node similarity scores to different countries/industries/queries using a generalized linear mixed effect model (GLMix). This can help capture local differences based on locations or companies. For example, in the U.S., a job title may be commonly referred to as "software engineer" whereas the same job title may be referred to in Canada as "software developer." Likewise there may be company-specific entities. For example, at Disney, a job title called "Imagineer" may be referred to as a "Theme Park Engineer" at Six Flags. The GLMix model helps capture these differences. Other types of random effects models may also be incorporated in some example embodiments, such as a per-industry model.

This GLMix model may be, for example $$g(E[y_{abc}]) = x'_{abc}g + s'_b \alpha_a + t'_a \beta_b$$

where $g(E[y - abc]) = \log \frac{E[y_{abc}]}{1 - E[y_{abc}]}$ is the link function, g is the global coefficient vector (also called fixed effect coefficients), $\alpha_a$ is a coefficient vector specific to country $\alpha$, $\beta_b$ is a coefficient vector specific to country b, and c is the context, of where a candidate is shown.

Note, that in some example embodiments, it is also possible to utilize only one or the other of the random effects coefficients or to have an additional random effects coefficient $\gamma_q$ on a per-query basis, which can then be combined with features on the country-candidate or company-candidate spaces respectively. Global features may include, for example, similarity features from the embeddings described above, such as:

Title to Title/Company/Location/School/Industry/Skill/Query Term

Company to Title/Company/Location/School/Industry/Skill/Query Term

Location to Title/Company/Location/School/Industry/Skill/Query Term

School to Title/Company/Location/School/Industry/Skill/Query Term

Industry to Title/Company/Location/School/Industry/Skill/Query Term

Skill to Title/Company/Location/School/Industry/Skill/Query Term

Conditional Entropy may be another global feature. Conditional entropy quantifies the amount of information needed to describe the outcome of one random variable given the value of another random variable. Therefore, it is quite suitable in the cross facet scenario. In an example embodiment, size facets may be the focus tide, company, industry, school, skill, and location. Values among the six facets have different characteristics. In the Skill facet, for example, values are inclusive. For example, a person with the "Java" skill can have the "Hadcon" skill. However, in other facets such as Title, Company (current), and Industry, values are exclusive. For example, a person with "Microsoft" as the company is not likely to have "Goldman Sachs" as a company. In this case, different methodologies may be used for inclusive facets and exclusive facets.

In order to utilize conditional entropy in cross-facet suggestions, a distinction is made between an exclusive facet and an inclusive facet. For exclusive facets, such as title, the values exclude each other within the facet. As such, the system would not be suggesting alternative values within the facet but would be suggesting values in other facets (cross-facet suggestions). In an example embodiment, a min max framework is employed to measure the significance of adding a particular value in one of these other facets. Here, a maximum conditional entropy gain for each of these other facets is computed by adding each value in each of these other facets. Next, the minimum maximum gain over ail of these other facets is computed.

Specifically:

$$\text{signal} = \min_{f_i} \{\max_{v_j \in f_i} \text{CondEntropyGain}(v, v_j)\}$$

Here $f_i$ is the facet, $v_j$ is the particular value in facet $f_i$, CondEntropyGain(v, $v_j$) is th gain for conditional entropy by adding the value $v_j$ into the facet. Conditional entropy may be defined as follows:

$$\text{CondEntropyGain}(v_i \mid v_j) = \left(1 - \frac{N(v_i \mid v_j)}{N(v_i) + N(v_j) - N(v_i, v_j)}\right)$$
$$* \log(10, 10 + N(v_i) - N(v_i, v_j))$$

where $N(v_i)$, $N(v_j)$ and $N(v_i, v_j)$ are the number of members with value $v_i$, the number of members with value $v_j$ and the number of members with both $v_i$ and $v_j$ respectively. Thus, the conditional entropy calculation is based on the cooccurrence of values $v_i$ and $v_j$ in member profiles.

For inclusive facets, such as skills, the values are inclusive of others within the facet. Therefore, for cross facet conditional entropy, the min max framework used for exclusive facets can be used, but for within-facet conditional entropy, the minimum value gain across all values within the facet may be used.

Entity Affinity score may be another global feature. Co-occurrence between values from two facets can be used to calculate an affinity score between the two facets. The co-occurrence count may be normalized by the maximum counts of the facets. If there are more than two impression values in each facet, a position-discounted weighted sum may be applied to calculate the entity affinity score.

Homophily score may be another global feature. Homophily is the tendency of individuals to form groups. Specifically, the location of searchers/recruiters plays an important role in candidate discovery in the recruiting scenario. Thus, searchers' locations may be taken into account.

Random effect features include the global features described above, as well as features to incorporate into the GLMix random-effect model, such as Standardized entity ID features. This may include, for example:

Company ID

Title ID

Location ID

School ID

Industry ID

Skill ID

Figure 10:
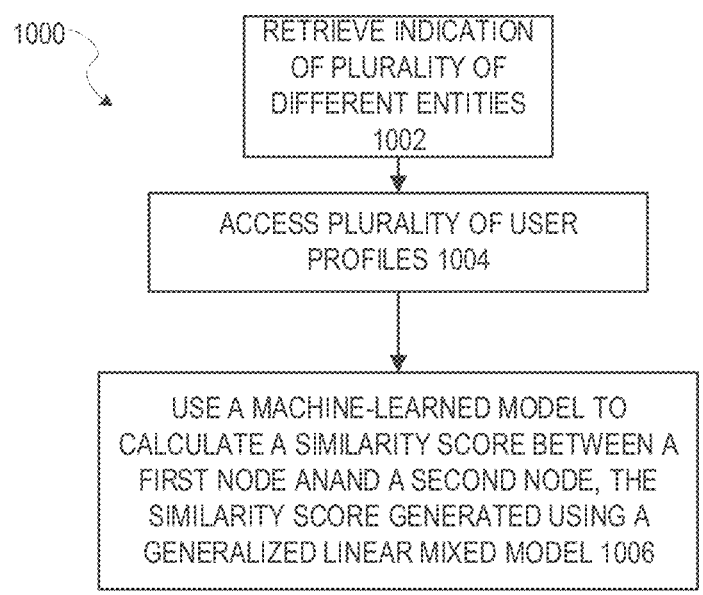
FIG. 10 is a flow diagram illustrating a method for using GLMix to calculate similarity between entities in a social networking service, in accordance with an example embodiment.

FIG. 10 is a flow diagram illustrating a method 1000 for using GLMix to calculate similarity between entities in a social networking service, in accordance with an example embodiment. At operation 1002, an indication of a plurality of different entities in a social networking service is received, including at least two entities having a different entity type. At operation 1004, a plurality of user profiles in the social networking service are accessed. At operation 1006, a machine-learned model is used to calculate, based on concurrence counts reflecting a number of user profiles in the plurality of user profiles in which corresponding nodes co-occurred, a similarity score between a first node and second node by computing distance between the first node and the second node in a d-dimensional space on which a plurality of entities art mapped the similarity score generated using a generalized linear mixed model having a global coefficient vector applied to global function pertaining to the co-occurrence counts and a first random effects coefficient vector applied to a random effects per-country function.

In some example embodiments, the generalized linear mixed model further comprises a second random effects coefficient vector applied to a random effects per-industry model, as well as possibly a third random effects coefficient vector applied to a random effects per-query model.

Modules, Components, and Logic

Certain embodiments are described herein as including logic or a number of components, modules, or mechanisms Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a stand-alone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of tune and to constitute a different hardware module at a different instance of time.

Hardware modules can provide information to and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-10 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device such as a mobile phone, tablet device, or so forth. A slightly different hardware and soil ware architecture may yield a smart device for use in the "Internet of Things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 11:
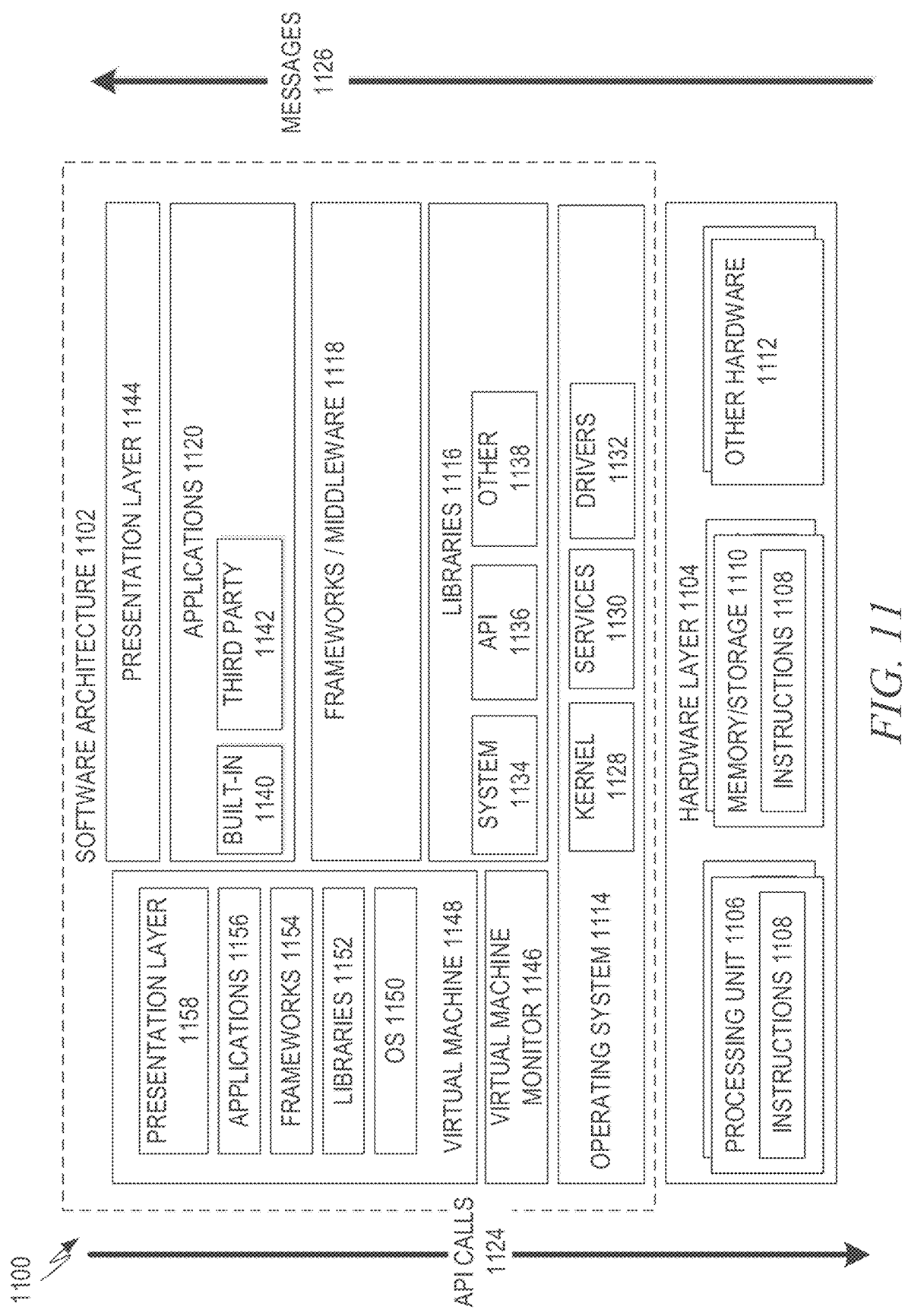
FIG. 11 is a block diagram illustrating a representative software architecture, which may be used in conjunction with various hardware architectures herein described.

FIG. 11 is a block diagram 1100 illustrating a representative software architecture 1102, which may be used in conjunction with various hardware architectures herein described FIG. 11 is merely a non-limiting example of a software architecture, and it will be appreciated that many other architectures may be implemented to facilitate the functionality described herein. The software architecture 1102 may be executing on hardware such as a machine 1200 of FIG. 12 that includes, among other things, processors 1210, memory/storage 1230, and I/O components 1250. A representative hardware layer 1104 is illustrated and can represent, for example, the machine 1200 of FIG. 12. The representative hardware layer 1104 comprises one or more processing units 1106 having associated executable instructions 1108. The executable instructions 1108 represent the executable instructions of the software architecture 1102, including implementation of the methods, modules, and so forth of FIGS. 1-10. The hardware layer 1104 also includes memory and/or storage modules 1110, which also have the executable instructions 1108. The hardware layer 1104 may also comprise other hardware 1112, which represents any other hardware of the hardware layer 1104, such as the other hardware illustrated as part of the machine 1200.

In the example architecture of FIG. 11, the software architecture 1102 may be conceptualized as a stack of layers where each layer provides particular functionality. For example, the software architecture 1102 may include layers such as an operating system 1114, libraries 1116, frameworks/middleware 1118, applications 1120, and a presentation layer 1144. Operationally, the applications 1120 and/or other components within the layers may invoke API calls 1124 through the software slack and receive responses, returned values, and so forth, illustrated as messages 1126, in response to the API calls 1124. The layers illustrated are representative in nature and not all software architectures have all layers. For example, some mobile or special purpose operating systems may not provide a layer of frameworks/middleware 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and soon. The services 1130 may provide other common services for the other software layers. The drivers 1132 may be responsible for controlling or interfacing with the underlying hardware. For instance, the driver's 1132 may include display drivers, camera drivers, Bluetooth® drivers, flash memory drivers, serial communication drivers (e.g., Universal Serial Bus (USB) drivers). Wi-Fi® drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than by interfacing directly with the underlying operating system 1114 functionality (e.g., kernel 1128, services 1130, and/or drivers 1132). The libraries 1116 may include system libraries 1134 (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks 1118 (also sometimes referred to as middleware) may provide a higher-level common infrastructure that may be utilized by the applications 1120 and/or other software components/modules. For example, the frameworks 1118 may provide various graphic user interface (GUI) functions, high-level resource management, high-level location services, and so forth. The frameworks 1118 may provide a broad spectrum of other APIs that may be utilized by the applications 1120 and/or other software components/modules, some of which may be specific to a particular operating system or platform.

The applications 1120 include built-in applications 1140 and/or third-party applications 1142. Examples of representative built-in applications 1140 may include, but are not limited to, a contacts application, a browser application, a book reader application, a location application, a media application, a messaging application, and/or a game application. The third-party applications 1142 may include any of the built-in applications 1140 as well as a broad assortment of other applications. In a specific example, the third-party application 1142 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1142 may invoke the API calls 1124 provided by the mobile operating system such as the operating system 1114 to facilitate functionality described herein.

The applications 1120 may utilize built-in operating system 1114 functions (e.g., kernel 1128, services 1130, and/or drivers 1132), libraries 1116 (e.g., system libraries 1134, API libraries 1136, and other libraries 1138), and frameworks/middleware 1118 to create user interfaces to interact with users of the system. Alternatively, or additionally, in some systems, interactions with a user may occur through a presentation layer, such as the presentation layer 1144. In these systems, the application/module "logic" can be separated from the aspects of the application/module that interact with a user.

Some software architectures utilize virtual machines. In the example of FIG. 11, this is illustrated by a virtual machine 1148. A virtual machine creates a software environment where applications/modules can execute as if they were executing on a hardware machine (such as the machine 1200 of FIG. 12, for example). A virtual machine is hosted by a host operating system (e.g., operating system 1114 in FIG. 11) and typically, although not always, has a virtual machine monitor 1146, which manages the operation of the virtual machine 1148 as well as the interface with the host operating system (e.g., operating system 1114). A software architecture executes within the virtual machine 1148, such as an operating system 1150, libraries 1152, frameworks/middleware 1154, applications 1156, and/or a presentation layer 1158. These layers of software architecture executing within the virtual machine 1148 can be the same as corresponding layers previously described or may be different.

Example Machine Architecture and Machine-Readable Medium

Figure 12:
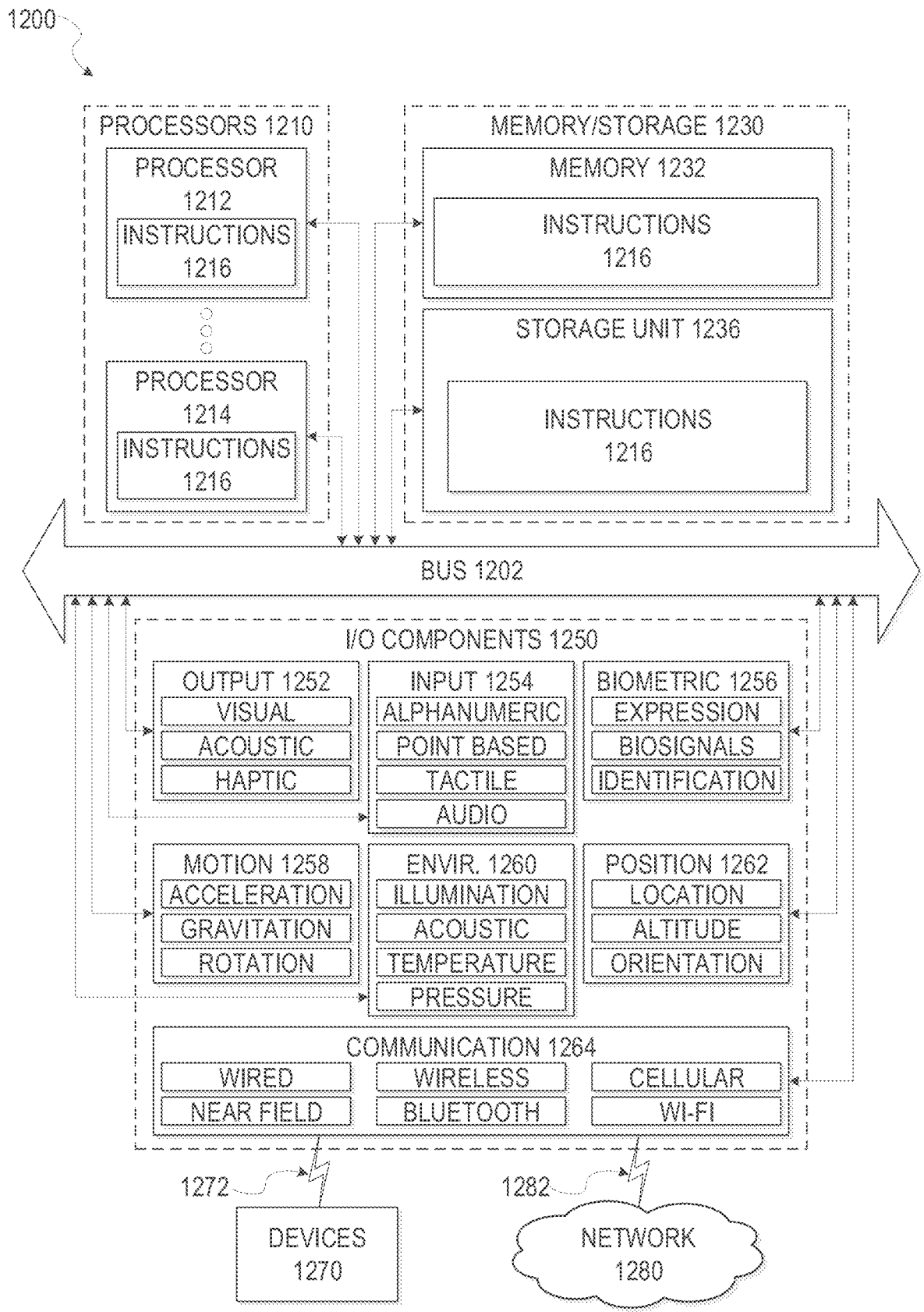
FIG. 12 is a block diagram illustrating components of a machine, according to some example embodiments, able to read instructions from a machine-readable medium (e.g., a machine-readable storage medium) and perform any one or more of the methodologies discussed herein.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. The instructions 1216 transform the general, non-programmed machine into a particular machine programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer for distributed) network environment. The machine 1200 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory/storage 1230, and I/O components 1250, which may be configured to communicate with each other such as via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1212 and a processor 1214 that may execute the instructions 1216. The term "processor" is intended to include multi-core processors that may comprise two or more independent processors (sometimes referred to as "cores") that may execute instructions contemporaneously. Although FIG. 12 shows multiple processors 1210, the machine 1200 may include a single processor with a single core, a single processor with multiple cores (e.g., a multi-core processor), multiple processors with a single core, multiple processors with multiples cores, or any combination thereof.

The memory/storage 1230 may include a memory 1232, such as a main memory, or other memory storage, and a storage unit 1236, both accessible to the processors 1210 such as via the bus 1202. The storage unit 1236 and memory 1232 store the instructions 1216 embodying my one or more of the methodologies or functions described herein. The instructions 1216 may also reside, completely or partially, within the memory 1232, within the storage unit 1236, within at least one of the processors 1210 (e.g., within the processor's cache memory), or any suitable combination thereof, during execution thereof by the machine 1200. Accordingly, the memory 1232, the storage unit 1236, and the memory of the processors 1210 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., instructions 1216) for execution by a machine (e.g., machine 1200), such that the instructions, when executed by one or more processors of the machine (e.g., processors 1210), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1250 may include a wide variety of components to receive input, provide output, produce output, transmit information, exchange information, capture measurements, and so on. The specific I/O components 1250 that are included in a particular machine will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input component 1254 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1250 may include biometric components 1256, motion components 1258, environmental components 1260, or position components 1262, among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 may include acceleration sensor components (e.g., accelerometer), gravitation sensor components, rotation sensor components (e.g., gyroscope), and so forth. The environmental components 1260 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1262 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 vita coupling 1282 and a coupling 1272, respectively. For example, die communication components 1264 may include a network interface component or other suitable device to interface with the network 1280. In further examples, the communication components 1264 may include wired communication components, wireless communication components, cellular communication components. Near Field Communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a USB).

Moreover, the communication components 1264 may detect identifiers or include components operable to detect identifiers. For example, the communication components 1264 may include Radio Frequency Identification (RFID) tag reader components. NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identity tagged audio signals). In addition, a variety of information may be derived via the communication components 1264, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1280 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1280 or a portion of the network 1280 may include a wireless or cellular network and the coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1×RTT), Evolution-Data Optimized (EVDO) technology, General Packet Radio Service (GPRS) technology. Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1210 may be transmitted or received over the network 1280 using a transmission medium via a network interface device (e.g., a network interface component included in the communication components 1264) and utilizing any one of a number of well-known transfer protocols (e.g., HTTP). Similarly, the instructions 1216 may be transmitted or received using a transmission medium via the coupling 1272 (e.g., a peer-to-peer coupling) to the devices 1270. The term "transmission medium" shall be taken to include any intangible medium that is capable of storing, encoding, or carrying the instructions 1216 for execution by the machine 1200, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the an to practice the teachings disclosed. Other embodiments may be used and derived therefrom, such that structural and logical substitutions and changes may be made without departing from the scope of this disclosure. The Detailed Description, therefore, is not lobe taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are accordingly, to be regarded in an illustrative rather than a restrictive sense.

What is claimed is:

1. A system comprising:
one or more processors;
a computer-readable medium having instructions stored thereon, which, when executed by the one or more processors, cause the system to:
retrieve an indication of a plurality of different entities in a social networking service, including at least two entities having a different entity type, each entity type being a different category of entities;
access a plurality of user profiles in the social networking service;
use a machine-learned model to calculate, based on co-occurrence counts reflecting a number of user profiles in the plurality of user profiles in which corresponding nodes co-occurred, a similarity score between a first node and second node by computing distance between the first node and the second node in a d-dimensional space on which a plurality of entities are mapped, the similarity score generated using a generalized linear mixed model having a global coefficient vector applied to global function pertaining to the co-occurrence counts and a first random effects coefficient vector applied to a random effects per-country function, the random effects per-country function uniquely corresponding to a particular country; and
use the similarity score to determine an entity to display on a computing device.

2. The system of claim 1, wherein the generalized linear mixed model further comprises a second random effects coefficient vector applied to a random effects per-industry model.

3. The system of claim 1, wherein the generalized linear mixed model further comprises a second random effects coefficient vector applied to a random effects per-query model.

4. The system of claim 1, wherein the generalized linear mixed model further comprises a third random effects coefficient vector applied to a random effects per-query model.

5. The system of claim 1, wherein the machine-learned model uses similarity scores between entity pairs, the entity pairs each including a first entity and a second entity, the first entity and the second entity each having an entity type selected from a group consisting of: title, company, location, school, industry, and skill.

6. The system of claim 1, wherein a first entity corresponds to an entity contained in a first user profile returned to a first user in response to a first search query, and the instructions further cause the system to:
determine that a second entity corresponds to an entity to recommend to the first user in response to the first search query based on the calculated similarity score; and
present the second entity as a recommended addition to the first search query.

7. The system of claim 6, wherein the presenting of the second entity includes displaying the entity corresponding to the second node as a selectable facet in a graphical user interface displaying the first user profile as a search result for the first search query.

8. A computer-implemented method, comprising:
retrieving an indication of a plurality of different entities in a social networking service, including at least two entities having a different entity type, each entity type being a different category of entities;
accessing a plurality of user profiles in the social networking service;
using a machine-learned model to calculate, based on co-occurrence counts reflecting a number of user profiles in the plurality of user profiles in which corresponding nodes co-occurred, a similarity score between a first node and second node by computing distance between the first node and the second node in a d-dimensional space on which a plurality of entities are mapped, the similarity score generated using a generalized linear mixed model having a global coefficient vector applied to global function pertaining to the co-occurrence counts and a first random effects coefficient vector applied to a random effects per-country function, the random effects per-country function uniquely corresponding to a particular country; and
using the similarity score to determine an entity to display on a computing device.

9. The method of claim 8, wherein the generalized linear mixed model further comprises a second random effects coefficient vector applied to a random effects per-industry model.

10. The method of claim 8, wherein the generalized linear mixed model further comprises a second random effects coefficient vector applied to a random effects per-query model.

11. The method of claim 8, wherein the generalized linear mixed model further comprises a third random effects coefficient vector applied to a random effects per-query model.

12. The method of claim 8, wherein the machine-learned model uses similarity scores between entity pairs, the entity pairs each including a first entity and second entity, the first entity and second entity each having an entity type selected from a group consisting of: title, company, location, school, industry, and skill.

13. The method of claim 8, wherein a first entity corresponds to an entity contained in a first user profile returned to a first user in response to a first search query, and the method further comprises:
determining that a second entity corresponds to an entity to recommend to the first user in response to the first search query based on the calculated similarity score; and
presenting the second entity as a recommended addition to the first search query.

14. The method of claim 13, wherein the presenting of the second entity includes displaying the entity corresponding to the second node as a selectable facet in a graphical user interface displaying the first user profile as a search result for the first search query.

15. A non-transitory machine-readable storage medium comprising instructions, which when implemented by one or more machines, cause the one or more machines to perform operations comprising:

retrieving an indication of a plurality of different entities in a social networking service, including at least two entities having a different entity type, each entity type being a different category of entities;

accessing a plurality of user profiles in the social networking service;

using a machine-learned model to calculate, based on co-occurrence counts reflecting a number of user profiles in the plurality of user profiles in which corresponding nodes co-occurred, a similarity score between a first node and second node by computing distance between the first node and the second node in a d-dimensional space on which a plurality of entities are mapped, the similarity score generated using a generalized linear mixed model having a global coefficient vector applied to global function pertaining to the co-occurrence counts and a first random effects coefficient vector applied to a random effects per-country function, the random effects per-country function uniquely corresponding to a particular country; and using the similarity score to determine an entity to display on a computing device.

16. The non-transitory machine-readable storage medium of claim 15, wherein the generalized linear mixed model further comprises a second random effects coefficient vector applied to a random effects per-industry model.

17. The non-transitory machine-readable storage medium of claim 15, wherein the generalized linear mixed model further comprises a second random effects coefficient vector applied to a random effects per-query model.

18. The non-transitory machine-readable storage medium of claim 15, wherein the generalized linear mixed model further comprises a third random effects coefficient vector applied to a random effects per-query model.

19. The non-transitory machine-readable storage medium of claim 15, wherein the machine-learned model uses similarity scores between entity pairs, the entity pairs each including a first entity and second entity, the first entity and second entity each having an entity type selected from a group consisting of: title, company, location, school, industry, and skill.

20. The non-transitory machine-readable storage medium of claim 15, wherein a first entity corresponds to an entity contained in a first user profile returned to a first user in response to a first search query, and the instructions further comprise:

determining that a second entity corresponds to an entity to recommend to the first user in response to the first search query based on the calculated similarity score; and presenting the second entity as a recommended addition to the first search query.

* * * * *